United States Patent [19]
Harrington et al.

[11] Patent Number: 5,237,517
[45] Date of Patent: Aug. 17, 1993

[54] COLOR PRINTING HAVING A HIGHLIGHT COLOR IMAGE MAPPED FROM A FULL COLOR IMAGE

[75] Inventors: Steven J. Harrington, Holley; R. Victor Klassen, Webster, both of N.Y.

[73] Assignee: Xerox Corporation, Stamford, Conn.

[21] Appl. No.: 574,145

[22] Filed: Aug. 29, 1990

[51] Int. Cl.$^5$ .............................................. G01D 15/00
[52] U.S. Cl. ................................. 364/526; 358/500; 346/157
[58] Field of Search ............... 364/526; 395/106, 131; 346/1.1, 157; 358/81, 75; 340/703

[56] References Cited

U.S. PATENT DOCUMENTS

| | | | |
|---|---|---|---|
| 4,554,241 | 11/1985 | Edwards | 430/301 |
| 4,636,839 | 1/1987 | Cole et al. | 358/81 |
| 4,670,780 | 6/1987 | McManus et al. | 358/80 |
| 4,682,186 | 7/1987 | Sasaki et al. | 358/80 |
| 4,761,669 | 8/1988 | Langdon | 346/159 |
| 4,894,665 | 1/1990 | Davis | 346/1.1 |
| 4,903,048 | 2/1990 | Harrington | 346/157 |
| 4,907,078 | 3/1990 | Hasebe | 358/81 |
| 4,908,779 | 3/1990 | Iwata | 340/703 |
| 4,933,878 | 6/1990 | Guttag et al. | 340/703 |

FOREIGN PATENT DOCUMENTS 0203448  5/1986  European Pat. Off. .
0264281  10/1987  European Pat. Off. .

OTHER PUBLICATIONS

"Color Gamut Transform Pairs", A. R. Smith, *Computer Graphics*, vol. 12, No. 3, 1978 pp. 12-19.

Primary Examiner—Kevin J. Teska
Assistant Examiner—Ellis B. Ramirez
Attorney, Agent, or Firm—Oliff & Berridge

[57] ABSTRACT

Mapping of full color images to highlight color images which provides excellent results for both pictorial image and presentation graphics applications is described. Shades and tints for each hue in the original full color image are mapped to a corresponding triangle of colors in the plane of the highlight hue. The apex of the triangle result colors is varied within the triangle of possible result colors according to hue. Differentiations in the result color for the fully saturated cases is provided while preserving the relative saturation and lightness behavior. The triangle of result colors matches the triangle of possible colors when the original hue matches the highlight hue. Mappings are provided for printers using red as the highlight color and also for printers using arbitrary highlight colors. The mappings preserve information important to the viewer while reducing dimensions of the color space. Different information can be preserved depending upon the particular application.

33 Claims, 8 Drawing Sheets

COLOR PRINTING HAVING A HIGHLIGHT COLOR IMAGE MAPPED FROM A FULL COLOR IMAGE

CROSS-REFERENCE TO RELATED ART

This application is related to U.S. patent application Ser. No. 07/517,895 filed Jun. 2, 1990, entitled "Color Editing of Simple Encoded Images", the disclosure of which is incorporated by reference herein.

BACKGROUND OF THE INVENTION

1. Field of the Invention

The present invention relates to color printing having a highlight color image mapped from a full color image and, more particularly, to highlight color printing which preserves information important to the viewer.

2. Description of the Related Art

Color images are a significant element in today's printing industry. As a result, electronic color printers and color image creation tools have been increasingly developed to obtain color images using electronic printing methods. Much of the color printing is performed using full color, the gamut of colors including tints and shades of the full color spectrum—reds, greens, blues and their combinations. A significant amount of color printing, however, can be performed using a highlight color. In this type of printing, only two inks are used in the printing process. These inks comprise black and a highlight color (usually red or blue). Electronic printers may be designed specifically for highlight color printing. The highlight color printer is generally faster and less expensive than the full color printer since only two inks are processed as opposed to the three or four inks which must be processed in order to obtain full color images.

The gamut of full colors is a three-dimensional volume which can be represented by the double hexagonal cone 10 illustrated in FIG. 1. In this representation, shades vary from dark to light as one moves upwards vertically. Tints vary from unsaturated grays to fully saturated colors as one moves out radially. Hues vary as one moves angularly in the horizontal plane.

The gamut of colors available to a highlight printer can be represented by the two-dimensional triangle 12 illustrated in FIG. 2. This is a slice from the full color double hexagonal cone of FIG. 1 at the angle of the highlight hue.

Prior attempts to print a full color image on a highlight color printer involve mapping the three-dimensional double hexagonal cone of FIG. 1 to the two-dimensional triangle of FIG. 2. The printer makes its best effort to render the highlight color image by mapping the full color specification into the set of colors which it can produce. In such a mapping, many different colors in the full color space will be mapped to the same color in the highlight color space. Information important to the viewer is often lost.

The related art has disclosed printing systems which attempt to provide color images.

Harrington U.S. Pat. No. 4,903,048 discloses color imaging using ink pattern designs in conjunction with registered two-color imaging to form simulated color images. A printing apparatus is described which is used to perform the two-color imaging.

Edwards U.S. Pat. No. 4,554,241 discloses a method of printing a realistic image of an original on a sheet. Two printing plates are used to print different impressions with two different coloring media.

Cole et al. U.S. Pat. No. 4,636,839 discloses a method and apparatus for generating color matte signals. RGB color components are calculated from hue, saturation and luminance value inputs. A new luminance value Y and color difference components CR and CB are calculated from these RGB values. Various algorithms are disclosed which are used for color calculation.

McManus et al. U.S. Pat. No. 4,670,780 discloses a method for matching hard copy colors to display colors for registered ink jet copiers. A color transformation for matching hard copy color to display color consists of an MSW color space which restricts the hard copy color to certain percentages of binary mixtures of inks (M), single inks (S) and paper white (W). Color data in XYZ is converted to the MSW space and unreachable display colors are matched into reachable hard copy colors. Corrections for color shifts due to interactions of the inks are also disclosed.

Langdon U.S. Pat. No. 4,761,669 discloses an electrophotographic highlight color printing machine in which printing is done in at least two different colors. Methods for transferring multiple color images simultaneously are disclosed.

Sasaki et al. U.S. Pat. No. 4,682,186 discloses a method for forming a color image. The color image is formed by using a plurality of coloring materials and controlling quantities of the coloring materials. When a density to be reproduced exceeds the density reproducible for that coloring material, the quantities of other coloring materials are reduced.

Hasebe U.S. Pat. No. 4,907,078 discloses a method of reproducing color images wherein two charge-coupled devices of different wavelengths are used to scan a full color document. The outputs of the charge-coupled devices are fed into a lookup table to determine the appropriate color in a two-color system. The output from the table is then recorded on a piece of paper. The system can be used for any type of copier.

Davis U.S. Pat. No. 4,894,665 discloses a method of generating an expanded color set of a low resolution color printer wherein a four-color printer can be expanded to twelve colors by printing a black dot next to a line to make the line seem darker. Two algorithms are provided for determining whether or not a line is critical and for enhancing a line.

Iwata U.S. Pat. No. 4,908,779 discloses a display pattern processing apparatus wherein a system can be programmed to convert a full color image into a number of other formats. An example is shown wherein an RGB image is converted into a two-color image.

While the related art attempts to map a full color image to a highlight color image, it does not recognize that certain information from the full color image should be preserved depending upon how the color is being used and what type of image is being created. Accordingly, information is lost in these devices.

OBJECTS AND SUMMARY OF THE INVENTION

Accordingly, one object of the present invention is to map a full color image to a highlight color image while preserving information important to the viewer.

Another object of the present invention is to map a full color image to a highlight color image such that different information is preserved in accordance with the type of image created.

Another object of the present invention is to map full color to highlight color such that if the full color happens to be in the highlight hue and producible by the printer, it is unchanged.

Another object of the present invention is to map full color to highlight color such that the relative saturation behavior and lightness behavior of the image are preserved.

A further object of the present invention is to map a full color image to a highlight color image for an arbitrary highlight color while preserving information important to the viewer.

To achieve the foregoing and other objects and to overcome the shortcomings discussed above, a mapping of full color images to highlight color images is provided in which information important to the viewer is preserved. The fully saturated color for any given hue in the full color image is mapped to the apex of a color triangle, the position of the apex varying according to hue. The apex is at some point within a triangle of printable colors. The set of the apex points for different hues describes the set of highlight colors generated by the mapping of fully saturated colors. For an arbitrary highlight hue, the fully saturated colors slide around a locus curve until the hue of the highlight color is mapped to the rightmost apex of the highlight gamut triangle. In creating pictorial images, the mapping is performed such that there is no more highlight color in the mapped image than is present in the original full color image.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
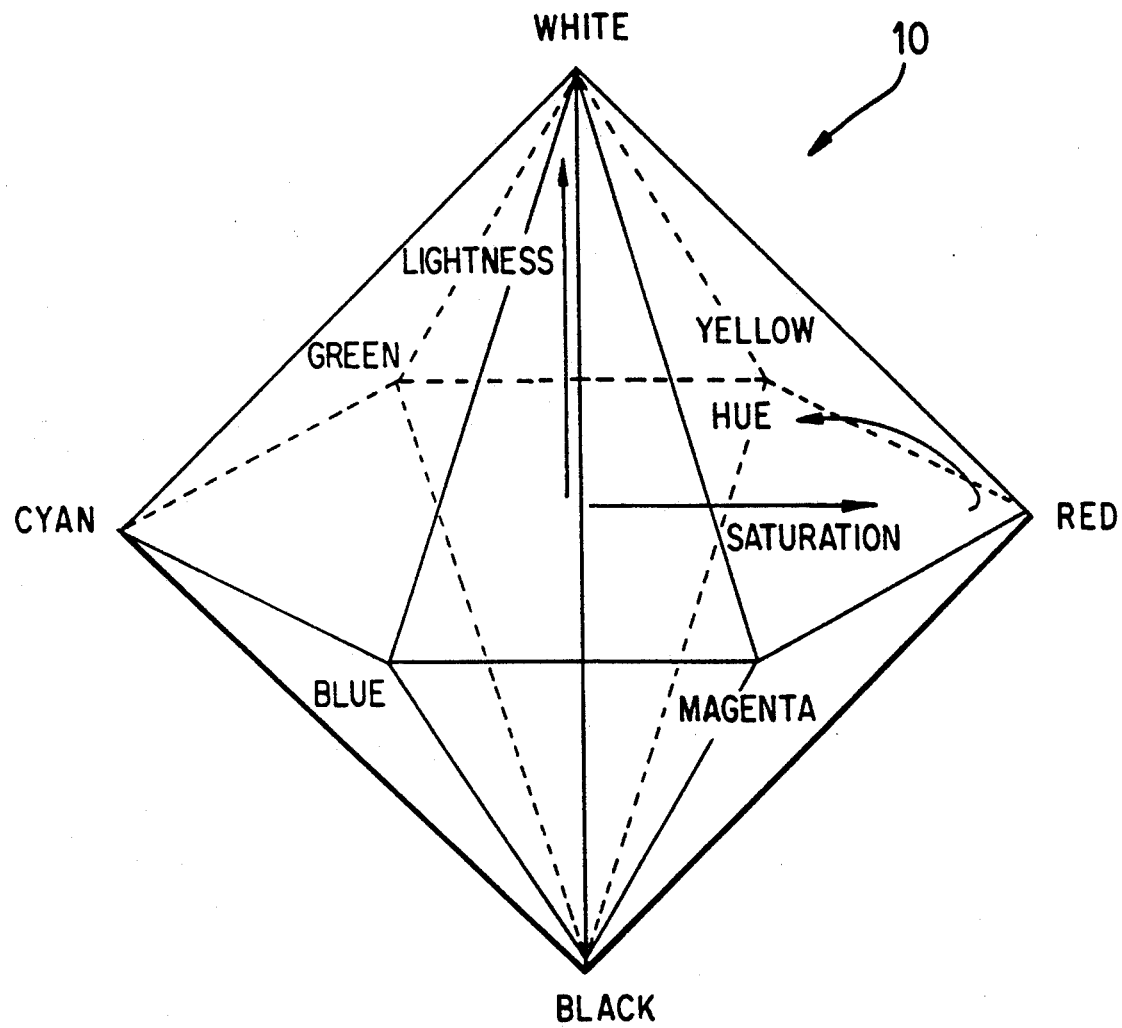
FIG. 1 illustrates the three-dimensional full color space.
Figure 2:
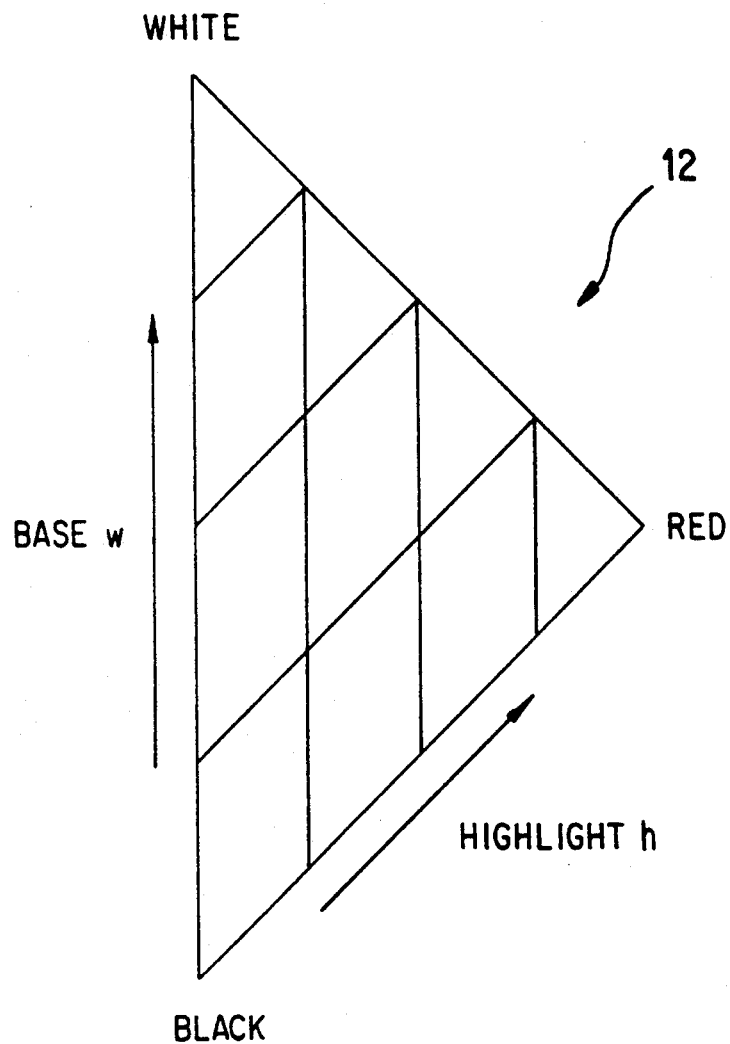
FIG. 2 illustrates the two-dimensional triangle of colors a highlight printer.
Figure 3:
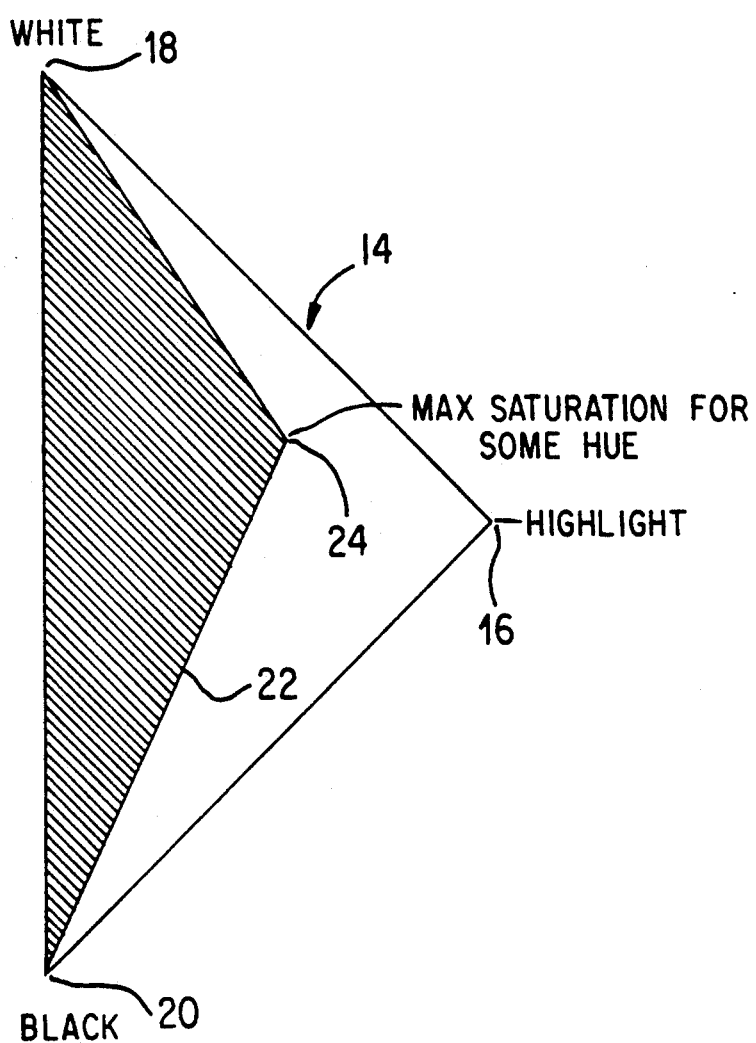
FIG. 3 illustrates a two-dimensional triangle of colors printable by a highlight color printer for any given hue.

Referring now to the drawings, and particularly to FIG. 3 thereof, the mapping of full color images to highlight color images is described. Triangle 14 defines the highlight color space comprising the different colors available to a highlight printer. Triangle 14 has an apex 16 corresponding to the fully saturated hue of the highlight color. Points 18 and 20 define the amounts of white and black, respectively, available to a highlight color printer.

To preserve information desirable in both presentation graphics and pictorial image applications, it is desirable to derive diverse colors for fully saturated hues in the full color image while still preserving the basic luminance and saturation behavior. For any given hue, the triangle of possible colors 14 will be mapped to a triangle of printable colors 22. The fully saturated color for the given hue maps to the apex 24 of the result color triangle 22. The position of apex 24 varies according to hue. If the hue matches that of highlight color, the apex 24 of the result color triangle 22 will coincide with the apex 16 of the triangle of possible colors 14, and the mapping will be the identity. For other hues, the apex 24 will be at some point within the triangle 14 of possible colors. The set of the apex points for different hues defines the set of highlight colors generated by the mapping of fully saturated colors.

The information which should be preserved depends upon how the color is being used. For pictorial images, most of the information lies in the luminance. For this reason, black and white photographs are easily recognizable. The hue in pictorial images is of secondary importance. For example, it is desirable to view a color image in which the sky is blue, the grass is green and faces are of flesh tones.

When color is used to highlight an image, the information derived is from the presence or absence of color rather than a gray level. A colored area with the same luminance as a gray area should look different. Highlight color documents may also vary in saturation.

In presentation graphics such as graphs and charts, by contrast, most of the information is in the hue. In this application, one usually selects strongly saturated colors for impact, using hue to differentiate them. An example of a mapping particularly applicable to presentation graphics is now described. In this example, red is used as the highlight color of the printer. The red, green and blue coordinates (r, g and b) of the full color image are determined. These coordinates each range between 0 and 1, with 0 meaning no color (black) and 1 meaning full color. Once the respective amounts of the red, green and blue coordinates of the full color image are determined, the resulting highlight color image can be determined by specifying the amounts of highlight color (h), white (w) and black (k) in the highlight color image in accordance with:

$$h = (3\ \text{MAX}(r,g,b) + r - \text{MAX}(g,b) - 3\ \text{MIN}(r,g,b))/4$$

$$w = (g - b + \text{MAX}(g,b) - \text{MIN}(r,g))/4 + \text{MIN}(r,g,b)$$

$$k = 1 - h - w.$$

The function MAX returns the maximum of its arguments, and the function MIN returns the minimum of its arguments.

Figure 4:
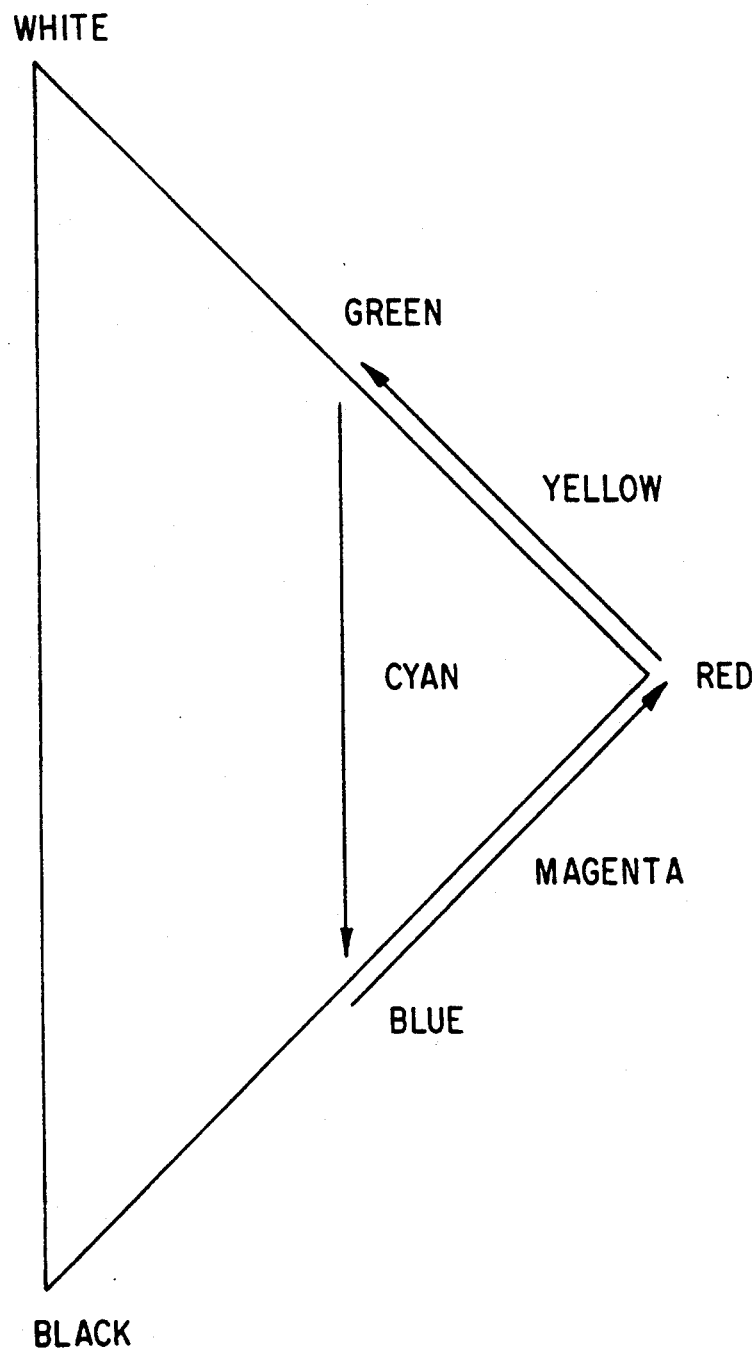
FIG. 4 illustrates a locus of mapping fully saturated colors.

FIG. 4 illustrates the locus of mapping fully saturated colors as set forth in the above example. The arrows define the path of the apex corresponding to fully saturated colors for given hues. In this mapping, every mapped fully saturated color is unique. Excellent results are achieved for presentation graphics applications. Any non-gray color is mapped to a non-gray result, and lightness saturation behavior is preserved. This provides very good results for highlight color applications.

As discussed above, it is important to preserve luminance in pictorial applications. While the above example preserves the relative lightness behavior, it is not as effective in preserving luminance. Luminance accounts for white and black, but luminance also includes the eye's sensitivity to different hues (for example, blue looks darker than yellow). While a picture is quite recognizable, dark hues such as blue may be mapped to lighter colors than light hues such as yellow. Even more significant are some unpleasant color shifts. As an example, when blue highlight color is used, unnatural blue flesh tones can be obtained in a mapped highlight color image.

An example of a mapping better suited for pictorial images using a red highlight color is herein described. Using this type of mapping, the luminance of the original image is preserved. In addition, there is never more highlight color present in the resultant highlight color image than the amount of that hue present in the original full color image. The luminance of the original full color image depends on the basis colors of the rgb color coordinates, but can be approximated by:

$$y = \tfrac{1}{4}r + \tfrac{2}{3}g + 1/12 b$$

wherein r, g and b are the respective amounts of the red, green and blue coordinates in the full color image. Each coordinate ranges between 0 and 1, with 0 meaning no color and 1 meaning full color. A resulting mapped highlight color image is determined by establishing highlight color (h), white (w) and black (k) in accordance with:

$$h = \mathrm{MIN}(4(\mathrm{MAX}(r,g,b) - y)/3,\ 4(y - \mathrm{MIN}(r,g,b)),\ r - \mathrm{MIN}(r,g,b))$$

$$w = y - h/4$$

$$k = 1 - h - w.$$

The function MAX returns the maximum of its arguments and the function MIN returns the minimum of its arguments.

Figure 5:
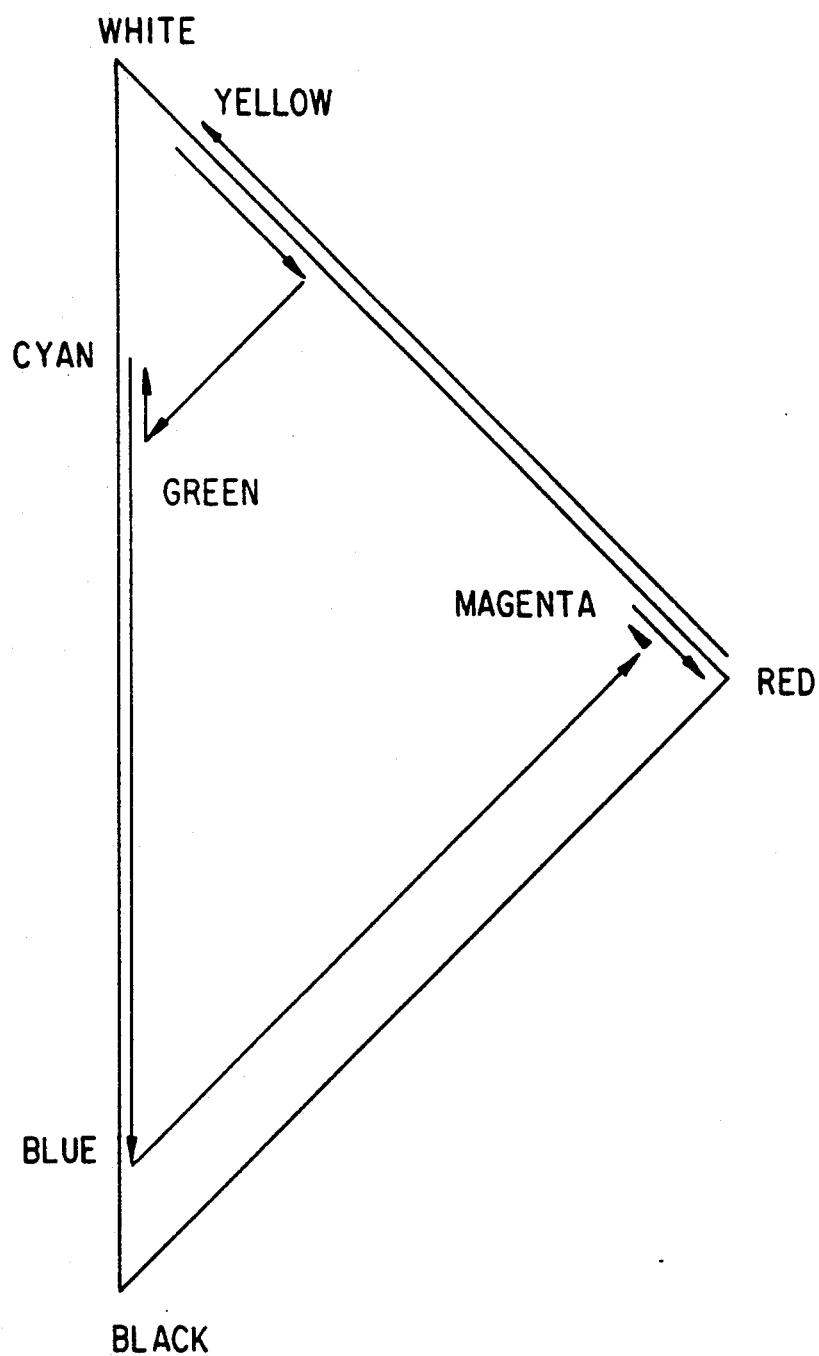
FIG. 5 illustrates an alternate locus of fully saturated colors especially useful for pictorial images.

FIG. 5 illustrates the locus of fully saturated colors using this mapping particularly applicable to pictorial images.

A slight variation in this mapping can be used to also improve the behavior of presentation graphics. As indicated above, this mapping would also preserve the luminance and restrict the amount of highlight color to no more than is present in the original full color image. In addition, however, further small reductions can be made in the amount of highlight color as a function of hue in order to disambiguate fully saturated colors which would otherwise be indistinguishable.

For this mapping, also using red as the highlight color, the following two constraints are added to the determination of the resulting mapped highlight color image:

$$h \leq (\mathrm{MAX}(r,g,b) + r - b - \mathrm{MIN}(r,g,b))/2$$

$$h \leq (\mathrm{MAX}(r,g,b) - (8g + \mathrm{MIN}(r,g,b))/9$$

Accordingly, the highlight color coordinate (h) of the resulting mapped highlight color image becomes:

$$H = \mathrm{MIN}(4(\mathrm{MAX}(r,g,b) - y)/3, 4(y - \mathrm{MIN}(r,g,b)),$$
$$r - \mathrm{MIN}(r,g,b),\ (\mathrm{MAX}(r,g,b) + r - b - \mathrm{MIN}(r,g,b))/2,$$
$$\mathrm{MAX}(r,g,b) - (8g + \mathrm{MIN}(r,g,b))/9).$$

Figure 6:
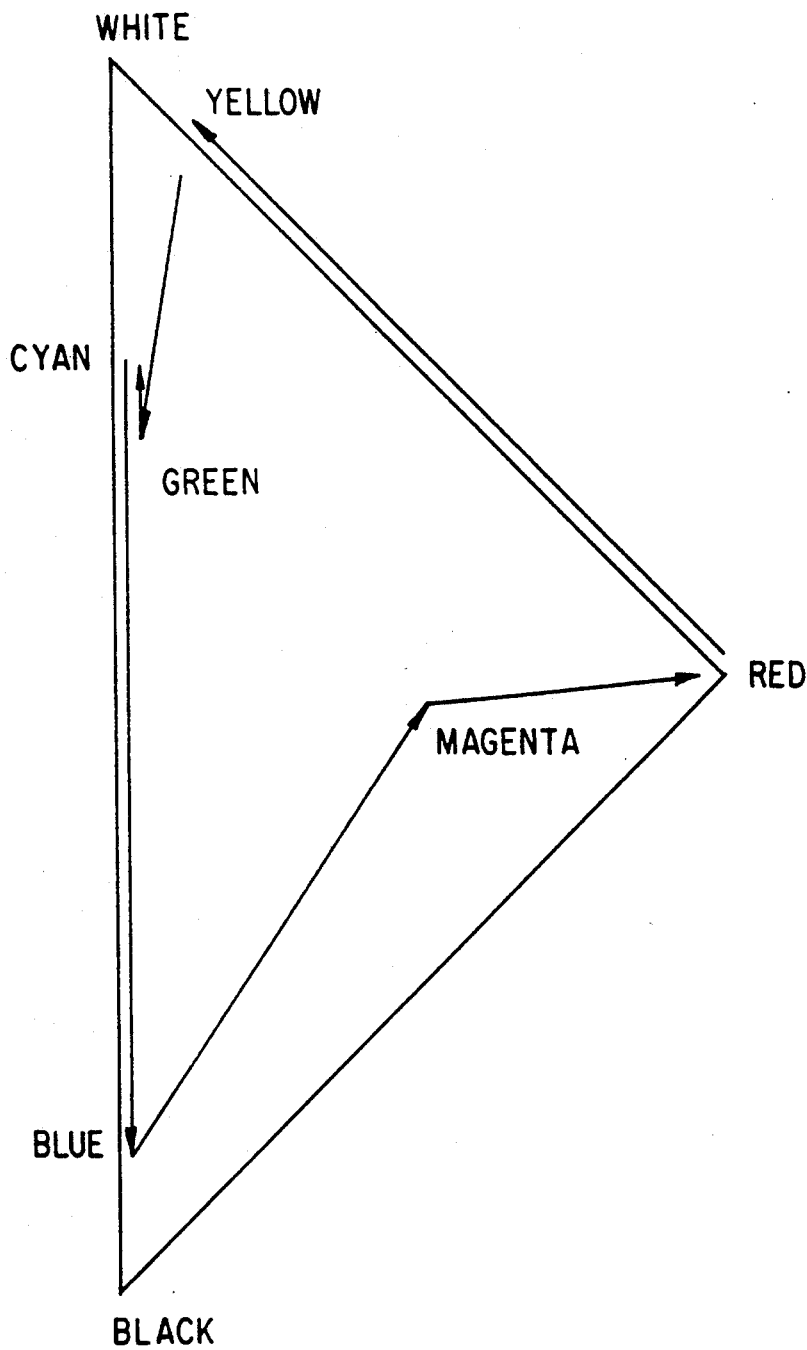
FIG. 6 illustrates an alternate locus of fully saturated especially useful for both pictorial and presentation graphics.

FIG. 6 illustrates the locus of fully saturated colors for the above described example of mapping full color images to highlight color images particularly applicable to both pictorial images and presentation graphics. Improved behavior is achieved in colors which mapped to the same result in the previous example. The removal of ambiguities enables fully saturated colors in the mapped image to be further distinguished while preserving luminance and restricting the amount of highlight color to no more than is present in the original full color image.

While the above-described mappings are used to map full color images to red highlight color images, the mappings can be generalized to enable mapping from full color images to arbitrary highlight color images, not just red highlight color images. Mapping to arbitrary highlight color images also preserves the general luminance and saturation behavior and maps fully saturated colors to a continuous, unique collection of highlight colors.

Figure 7:
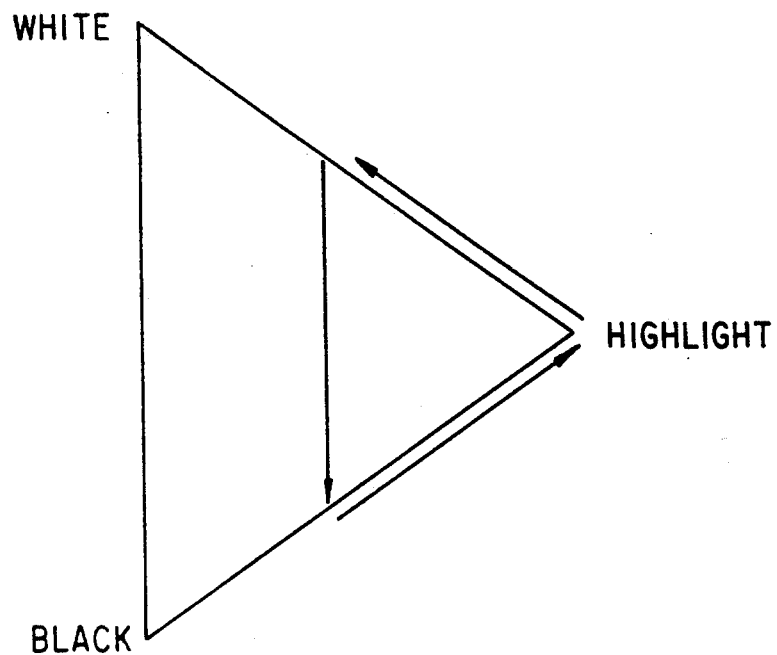
FIG. 7 illustrates a locus of fully saturated colors especially useful, for presentation graphics images for an arbitrary highlight color.

FIG. 7 illustrates the locus of fully saturated colors especially for an arbitrary highlight hue. To generalize to the arbitrary highlight hue, the fully saturated colors are slid around the locus triangle of FIG. 7 until the hue at the rightmost apex of the triangle corresponds to that of the arbitrary highlight color.

An operation for the reorientation of saturated colors can be carried out by a simple computer algorithm based on the definition of hue proposed by A. R. Smith in "Color Gamut Transform Pairs", *Computer Graphics*, Vol. 12, No. 3, pp. 12-19 (1978), the disclosure of which is herein incorporated by reference. A hue value in the range [0,6] is determined by adding a number based on which of the r, g, b components is largest, to an offset based on the relative strength of the second largest component. Under this definition, red (1,0,0) has hue 0, green (0,1,0) has hue 2 and blue (0,0,1) has hue 4. The secondary colors yellow, cyan, and magenta have values 1, 3, and 5 respectively.

Figure 8:
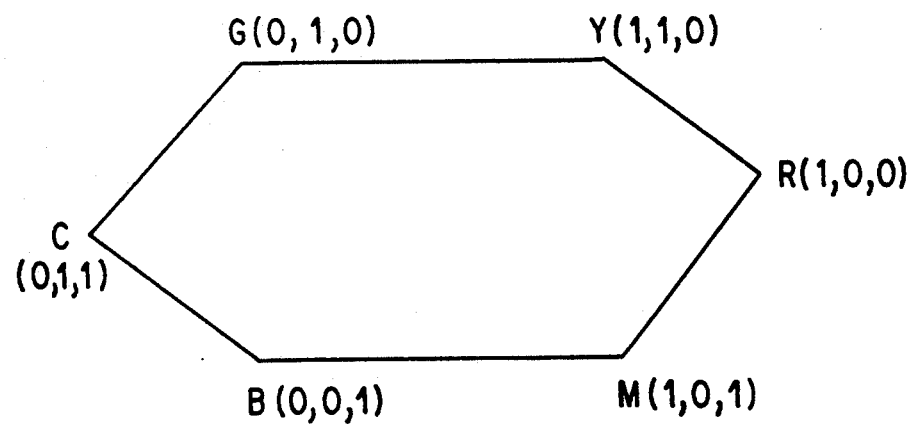
FIG. 8 illustrates the hexagon of fully saturated colors.

The algorithm uses a hue difference equal to the hue of a sample color minus the hue of the highlight color. A hue difference of 0 indicates that the sample color matches the hue of the highlight color. If the sample color is fully saturated (at least one of its r, g, b components is 1 and at least one is 0) and the sample matches the highlight hue, then it will be mapped to the rightmost apex of the triangle in highlight space. Following around the hexagon of fully saturated colors shown in FIG. 8 from the highlight color gives an increasing hue difference from 0 to 6, corresponding to the desired slide of the saturated colors around the locus triangle. Assuming a fixed sample (r, g, b), there is a corresponding fully saturated color x and its hue difference, a corresponding point on the locus triangle ($h_x, w_x$) and thus a triangle into which the sample must be mapped.

The mapped result for a sample color (r, g, b) depends upon: the amount of white in the sample, given by the minimum component $m = \mathrm{MIN}(r,g,b)$; the amount of color in the sample, given by the difference $d = \mathrm{MAX}(r,g,b) - m$; and the position of the apex point in highlight-white coordinates ($h_x, w_x$). The amount of highlight is the amount of color scaled by the highlight component of the apex, $h = d\,h_x$. The amount of white is the amount of white in the sample plus a term for the white shift of the apex, $w = m + d\, w_x$.

The implementation takes the form of nested conditionals yielding six cases corresponding to the six possible orderings of relative strengths of the three color components. One can determine the hue for a sample color and subtract from it the hue of the highlight color. The resulting difference can then be used to determine the point of the fully saturated color. The value 0 always corresponds to the rightmost apex of the triangle. The implementation calculates the variable hdiff which is the hue difference multiplied by the amount of chrominance d, since this is what is ultimately needed and combining the computations avoids a division. Finally, the amount of highlight color and white (or black) can be determined from the amount of chrominance and white in the original sample and the position of the corresponding fully saturated color. A program fragment written in the C programming language which does this is:

```
/* given r,g,b as the coordinates of the sample color */
/* compute h, w, the amount of highlight and white */
/* hlhue comes from the hue of the highlight color */
/* n gives the triangle size */
/* find sample's white, chrominance, and weighted hue
   difference */
if (r > g)
{if (g > b) /* case r > g > b */
    {m = b; d = r - b; hdiff = (1 - hlhue)*d - r + g;}
 else
    {if (r > b) /* case r > b >= g */
        {m = g; d = r - g; hdiff = (5 - hlhue)* d + r - b;}
     else /* case b >= r > g */
        {m = g; d = b - g; hdiff = (5 - hlhue)* d - b + r;}
    }}
 else
    {if (r > b) /* case g >= r > b */
        {m = b; d = g - b; hdiff = (1 - hlhue)*d + g - r;}
     else
        {if (g > b) /* case g > b >= r */
            {m = r; d = g - r; hdiff = (3 - hlhue)*d - g + b;}
         else /* case b >= g > r */
            {m = r; d = b - r; hdiff = (3 - hlhue)*d + b - g;}
    }}
if (hdiff < 0)
    hdiff = hdiff + 6*d;
/* determine highlight and white result */
if (hdiff < 2*d) /* map to top of locus triangle */
    {h = d - n*hdiff/2; w = d - h + m;}
else
    {if (hdiff < 4*d) /* map to left of locus triangle */
        {h = (1 - n)*d; w = n*(2*d - hdiff/2) + m;}
     else /* map to bottom of locus triangle */
        {h = (1 - 3*n)*d + hdiff*n/2; w = m;}
```

The program makes use of the variable hlhue which is derived from the highlight color as indicated below:

```
/* given the coordinates for the highlight color hlr, hlg, hlb */
/* calculate its corresponding hue parameter hlhue */
if (hlr > hlg)
{if (hlg > hlb) hlhue = 1 - (hlr - hlg)/(hlr - hlb);
 else
    {if (hlr > hlb) hlhue = 5 + (hlr - hlb)/(hlr - hlg);
     else hlhue = 5 - (hlb - hlr)/(hlb - hlg);
    }}
 else
    {if (hlr > hlb) hlhue = 1 + (hlg - hlr)/(hlg - hlb);
     else
        {if (hlg > hlb) hlhue = 3 - (hlg - hlb)/(hlg - hlr);
         else hlhue = 3 + (hlb - hlg)/(hlb - hlr);
    }}
```

The program also contains a scale factor n which determines the size of the triangle formed by the locus of saturated colors. To replicate the simple mapping given in the first example for red highlight, one would use hlhue=0 and n=0.5. Experiments with various other highlight hues indicate that the value n=0.5 may actually be smaller than the optimum. Increasing this value increases the differentiation of the saturated colors at the expense of colors available for the mapping of the unsaturated colors. A value of n=0.75 gives better results. Note that a value of n=1 would map the locus of saturated colors to the boundary of producible colors. This would give maximum differentiation of the saturated colors, but would map a third of all color space into gray.

Once the highlight color is known, the value of hlhue can be computed. This result and the desired size parameter n, when known, can be used to simplify some of the indicated arithmetic in the program fragment defined above. This should be done to reduce the amount of calculation required for mapping an individual color.

Note that some assumptions have been made to simplify this mapping. It is assumed that the sample colors have coordinates in the range [0,1] and no provisions have been made for out of gamut colors. Also, in order for the samples that match the highlight color to pass through this mapping unchanged, the highlight color must lie on the gamut boundary.

The above-described mapping is particularly effective for presentation graphics. It preserves the relative lightness behavior but does not completely preserve luminance. All saturated colors are mapped to different non-neutral colors in the highlight color plane. The mapping differentiates colors as well as indicates that the areas were colored in the original full color image.

Full color pictorial images can be mapped into arbitrary highlight colors while preserving luminance and including no more of the highlight color than was present in the full color image. To achieve this, however, one must define how much of one color is present in another color. One way this can be achieved is by expressing colors in the original full color image and in the highlight color in the YES coordinate system. In this coordinate system, Y is the luminance and E and S are the chrominance components. The E coordinate is the red-green scale, and the S coordinate is the yellow-blue scale. Using this coordinate system, the measure of color similarity is based on the chrominance components. The Y, E and S are determined in accordance with:

$$Y = 0.253\, r + 0.684\, g + 0.063\, b;$$

$$E = (r-g)/2;\ \text{and}$$

$$S = (r+g)/4 - b/2$$

Each of these coordinates is determined for the highlight color and sample color of the full color image.

The cube of the cosine function is used to measure the similarity of colors by determining the cosine of the angle between chrominance vectors. This cosine measure gives 1 when the colors are aligned and reduces to 0 when the vectors are at right angles. It is easily calculated from the dot product of the vectors. The cosine measure gives the projection of one color onto another. The YES coordinates of the highlight color $Y_h E_h S_h$ and the YES coordinates of the sample color $Y_s E_s S_s$ are used to obtain the following cosine cubed mapping to highlight and white amounts h and w, respectively:

$$h = MAX(0, (E_h E_s + S_h S_s)^3 / ((E_s^2 + S_s^2)(E_h^2 + S_h^2)^2))$$

$$w = MIN(1-h, Y_s h Y_h)$$

$$k = 1 - h - w.$$

Figure 9:
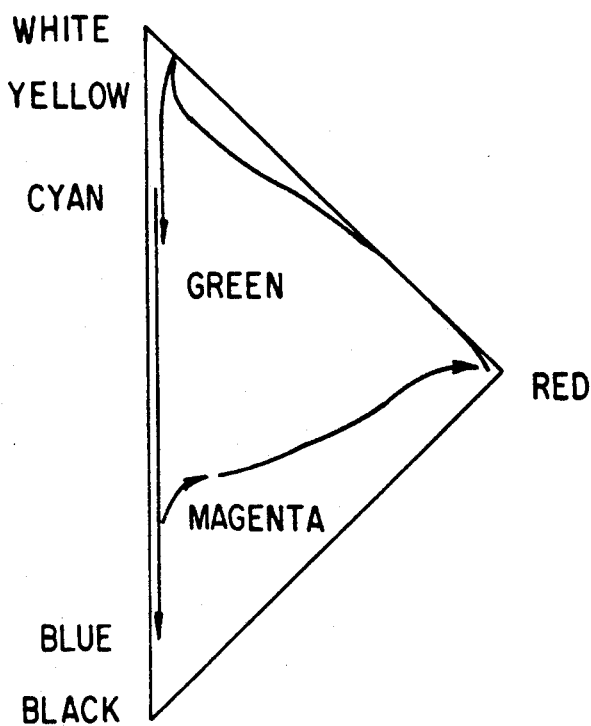
FIG. 9 illustrates a locus of fully saturated colors especially useful for pictorial images for an arbitrary highlight color.

FIG. 9 illustrates the locus of fully saturated colors for a red highlight color obtained using the mapping.

The above-described mapping of pictorial images preserves the luminance, while ensuring that there is no more highlight color in the mapped image than is present in the full color image and while generating natural looking pictorial images.

Figure 10:
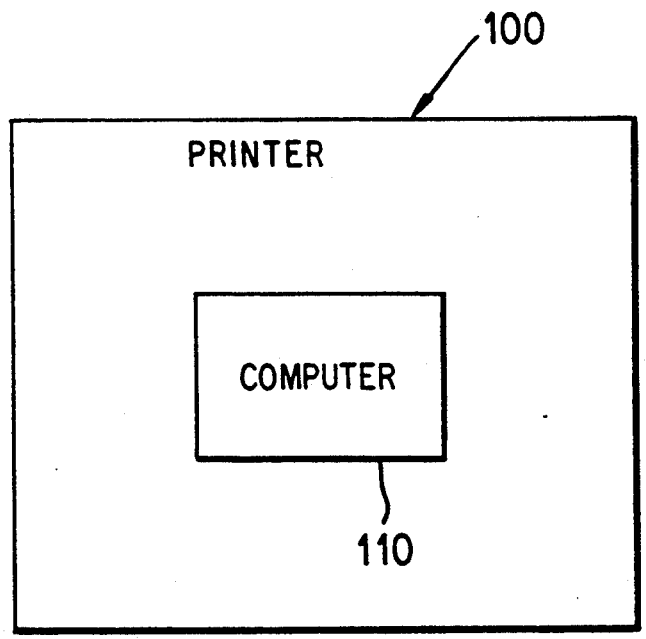
FIG. 10 is a block diagram of a device for mapping a full color image to a highlight color image.

FIG. 10 is a block diagram of a printer 100 which maps full color images to highlight color images. Printer 100 contains a computer 110 which determines the coordinates required for the above-described image mappings. Once these coordinates are determined, computer 110 controls printer 100 to generate the mapped images. A printing apparatus such as that described in U.S. Pat. No. 4,903,048, the disclosure of which is incorporated by reference herein, can be used to accomplish the mapping operation of the present invention.

The mappings from full color to highlight color as described above provide excellent results for both pictorial image and presentation graphics applications. The shades and tints for each hue are mapped to a corresponding triangle of colors in the plane of the highlight hue. The apex of the triangle of result colors is varied within the triangle of possible result colors according to hue. Differentiations are provided in the result color for the fully saturated cases while preserving relative saturation and lightness behavior. The triangle of result colors can exactly match the triangle of possible colors when the original hue matches the highlight hue, thereby specifying highlight colors in a manner consistent with full color specifications.

Simple mappings based on maximum and minimum functions are provided when the highlight color used is red. More general mappings are further provided which are used for arbitrary highlight colors.

While this invention has been described in conjunction with specific embodiments thereof, it is evident that many alternatives, modifications and variations will be apparent to those skilled in the art. Just as several illustrative mappings were presented, many are possible giving different tradeoffs of image quality, ease of calculation, generality and information preserved. Thus, the exemplary mappings do not exclude alternative mappings which preserve lightness and saturation behavior by mapping the colors of a given hue to a triangle of colors within the highlight gamut. Accordingly, the preferred embodiments of the invention as set forth herein are intended to be illustrative, not limiting. Various changes may be made without departing from the spirit and scope of the invention as defined in the following claims.

We claim:

1. A method of mapping a full color image to a highlight color image producible by a printer comprising the steps of:

defining a substantially planar triangular color space comprising a complete set of possible colors for a highlight color printer;

determining in said color space, the location of a fully saturated color for any given hue in the full color image;

mapping the color space to a triangle of printable colors for the given hue, said triangle being a subset of the color space and having its apex coinciding with the location of the fully saturated color of the given hue; and producing the highlight color image with said printer in accordance with the mapped full color image.

2. The method as recited in claim 1, further comprising the steps of:

selecting red as the highlight color; and mapping to the triangle of printable colors by:

a) determining the respective amounts of the red, green and blue coordinates (r, g, b) in the full color image, each coordinate ranging between 0 and 1; and b) determining a resulting highlight color image by specifying the amounts of highlight color (h), white (w) and black (k) in the highlight color image in accordance with:

$$h = (3 \, MAX(r,g,b) + r - MAX(g,b) - 3 \, MIN(r,g,b))/4$$

$$w = (g - b + MAX(g,b) - MIN(r,g))/4 + MIN(r,g,b)$$

$$k = 1 - h - w.$$

3. The method as recited in claim 1, further comprising the steps of:

preserving the luminance of the full color image in the mapped image, wherein the luminance (y) is determined by:

$$y = \tfrac{1}{4} r + \tfrac{2}{3} g + 1/12 b;$$

said preserving step including mapping to the triangle of printable colors by:

a) determining the respective amounts of the red, green and blue coordinates (r,g,b) in the full color image, each coordinate ranging between 0 and 1; and b) determining a resulting mapped highlight color image by determining highlight color (h), white (w) and black (k) in accordance with:

$$h = MIN(4(MAX(r,g,b) - y)/3, \, 4(y - MIN(r,g,b)), \, r - MIN(r,g,b))$$

$$w = y - h/4$$

$$k = 1 - h - w.$$

4. The method as recited in claim 3, further comprising the step of:

distinguishing fully saturated colors in the mapped image by determining the resulting mapped highlight color image by determining h in accordance with:

$$h = MIN(4(MAX(r,g,b) - y)/3, \, 4(y - MIN(r,g,b)), \\ r - MIN(r,g,b), \, (MAX(r,g,b) + r - b - MIN(r,g,b))/2, \\ MAX(r,g,b) - (8g + MIN(r,g,b))/9).$$

5. A method of mapping a full color image to an arbitrary highlight color image producible by a printer comprising the steps of:

defining a substantially planar triangular color space comprising a complete set of possible colors for a highlight color printer;

defining, in said color space, a locus curve of fully saturated colors;

identifying the hue of the highlight color of the printer;

sliding the full saturated colors around the locus curve until the hue at a rightmost point of the curve corresponds to the hue of the highlight color;

mapping the color space into a triangle of printable colors for a given hue, said triangle being a subset of the color space and having its apex coinciding with the location of a fully saturated color of the given hue; and producing the highlight color image with said printer in accordance with the mapped full color image.

6. A method of mapping a full color image to a highlight color image producible by a printer comprising the steps of:

expressing the highlight color in color coordinates of a color coordinate system;

expressing a sample color in the full color image in color coordinates of the color coordinate system;

using all of the color coordinates to map the full color image to a highlight color image such that the mapped highlight color image includes no more of the highlight color than is present in the sample color; and producing the highlight color image with said printer in accordance with the mapped full color image.

7. The method as recited in claim 6, further comprising the steps of:

determining the respective amounts of the red, green and blue coordinates (r, g, b) in the highlight color and the sample color, each coordinate (r, g, b) ranging between 0 and 1; and expressing the highlight color and sample color in the color coordinates $Y_h$, $E_h$, $S_h$ and $Y_s$, $E_s$, $S_s$ of the YES color coordinate system, respectively, Wherein Y, E and S are determined in accordance with:

$$Y = 0.253\ r + 0.684\ g + 0.063\ b;$$

$$E = (r-g)/2;\text{ and}$$

$$S = (r+g)/4 - b/2.$$

8. The method as recited in claim 7, further comprising the step of:

mapping the full color image to the highlight color image by specifying the amounts of highlight color (h), white (w) and black (k) in the highlight color image in accordance with:

$$h = \text{MAX}(0, (E_h E_s + S_h S_s)^3 / ((E_s^2 + S_s^2)(E_h^2 + S_h^2)^2))$$

$$w = \text{MIN}(1-h,\ Y_s - h Y_h)$$

$$k = 1 - h - w.$$

9. An apparatus for mapping a full color image to a highlight color image producible by a printer comprising:

defining means for defining a substantially planar triangular color space comprising a complete set of possible colors for a highlight color printer;

first determining means for determining in said color space, the location of a fully saturated color for any given hue in the full color image; and mapping means for mapping the color space to a triangle of printable colors for the given hue, said triangle being a subset of the color space and having its apex coinciding with the location of the fully saturated color of the given hue, wherein said printer comprises means for producing the highlight color image in accordance with the mapped full color image.

10. The apparatus as recited in claim 9, further comprising:

means for specifying red as the highlight color; and said mapping means including:

a) means for determining the respective amounts of the red, green and blue coordinates (r, g, b) in the full color image, each coordinate ranging between 0 and 1; and b) means for determining a resulting highlight color image by specifying the amounts of highlight color (h), white (w) and black (k) in the highlight color image in accordance with:

$$h = (3\ \text{MAX}(r,g,b) + r - \text{MAX}(g,b) - 3\ \text{MIN}(r,g,b))/4$$

$$w = (g - b + \text{MAX}(g,b) - \text{MIN}(r,g))/4 + \text{MIN}(r,g,b)$$

$$k = 1 - h - w.$$

11. The apparatus as recited in claim 9, further comprising:

preserving means for preserving the luminance of the full color image in the mapped image, wherein the luminance (y) is determined by:

$$y = \tfrac{1}{4} r + \tfrac{2}{3} g + 1/12\ b;$$

said preserving means including:

a) means for determining the respective amounts of the red, green and blue coordinates (r,g,b) in the full color image, each coordinate ranging between 0 and 1; and b) means for determining a resulting mapped highlight color image by determining highlight color (h), white (w) and black (k) in accordance with:

$$h = \text{MIN}(4(\text{MAX}(r,g,b) - y)/3,\ 4(y - \text{MIN}(r,g,b)), r - \text{MIN}(r,g,b))$$

$$w = y - h/4$$

$$k = 1 - h - w.$$

12. The apparatus as recited in claim 11, further comprising:

distinguishing means for distinguishing fully saturated colors in the mapped image for determining the resulting mapped highlight color image by determining h in accordance with:

$$h = \text{MIN}(4(\text{MAX}(r,g,b) - y)/3,\ 4(y - \text{MIN}(r,g,b)),$$
$$r - \text{MIN}(r,g,b),\ (\text{MAX}(r,g,b) + r - b - \text{MIN}(r,g,b))/2,$$
$$\text{MAX}(r,g,b) - (8g + \text{MIN}(r,g,b))/9).$$

13. An apparatus for mapping a full color image to an arbitrary highlight color image producible by a printer comprising:

first defining means for defining a substantially planar triangular color space comprising a complete set of possible colors for a highlight color printer;

second defining means for defining, in said color space, a locus curve of fully saturated colors;

identifying means for identifying the hue of the highlight color of the printer;

slide inducing means for sliding the fully saturated colors around the locus curve until the hue at a rightmost point of the curve corresponds to the hue of the highlight color; and mapping means for mapping the color space into a triangle of printable colors for a given hue, said triangle being a subset of the color space and having its apex coinciding with the location of a fully saturated color of the given hue, wherein said printer comprises means for producing the highlight color image in accordance with the mapped full color image.

14. An apparatus for mapping a full color image to a highlight color image producible by a printer comprising:

expressing means for expressing the highlight color in color coordinates of a color coordinate system;

expressing means for expressing a sample color in the full color image in color coordinates of the color coordinate system; and means for using all of the color coordinates to map the full color image to a highlight color image such that the mapped highlight color image includes no more of the highlight color than is present in the sample color, wherein said printer comprises means for producing the highlight color image in accordance with the mapped full color image.

15. The apparatus as recited in claim 14, further comprising:

determining means for determining the respective amounts of the red, green and blue coordinates (r, g, b) in the highlight color and the sample color, each coordinate (r, g, b) ranging between 0 and 1; and expressing means for expressing the highlight color and sample color in the color coordinates $Y_h$, $E_h$, $S_h$ and $Y_s$, $E_s$, $S_s$ of the YES color coordinate system, respectively, wherein Y, E and S are determined in accordance with:

$Y = 0.253\ r + 0.684\ g + 0.063\ b;$ $E = (r-g)/2;$ and $S = (r+g)/4 - b/2$

16. The apparatus as recited in claim 15, further comprising:

mapping means for mapping the full color image to the highlight color image by specifying the amounts of highlight color (h), white (w) and black (k) in the highlight color image in accordance with:

$h = MAX(0, (E_h E_s + S_h S_s)^3 / ((E_s^2 + S_s^2)(E_h^2 + S_h^2)^2))$ $w = MIN(1-h,\ Y_s - hY_h)$ $k = 1 - h - w.$

17. The method as recited in claim 1, wherein: said mapping step leaves unchanged all printable colors of the highlight hue of the printer.

18. The apparatus as recited in claim 9, wherein: said mapping means leaves unchanged all printable colors of the highlight hue of the printer.

19. The method as recited in claim further comprising:

said mapping step including projecting the chrominance of the full color on the chrominance of the highlight color to determine the amount of highlight color present.

20. The apparatus as recited in claim 9, wherein: said mapping means projects the chrominance of the full color on the chrominance of the highlight color to determine the amount of highlight color present.

21. The method as recited in claim 1, wherein: said mapping step preserves luminance of the full color image.

22. The apparatus as recited in claim 9, wherein: said mapping means preserves luminance of the full color image.

23. The method as recited in claim 1, wherein: said mapping step produces a different color result for every fully saturated color.

24. The apparatus as recited in claim 9, wherein: said mapping means produces a different color result for every fully saturated color.

25. A method of mapping a full color image to a highlight color image producible by a printer comprising the steps of:

defining a substantially planar triangular color space comprising a complete set of possible colors for a highlight color printer;

determining in said color space, the location of a fully saturated color for any given hue in the full color image;

mapping the color space to a triangle of printable colors for the given hue, said triangle being a subset of the color space and having its apex coinciding with the location of the fully saturated color of the given hue;

forming a combination of two different complementary ink latent image pixel charge patterns, with voids, interposed on a single charge retentive imaging surface with one imaging means from electronically stored sets of said complementary ink image patterns, to form a combined tri-level image pattern on said charge retentive imaging surface;

respectively developing said combined tri-level image on said charge retentive imaging surface with two differently colored inks to form a combined color image; and transferring said combined color image to a copy substrate in a single pass.

26. The method of claim 25, wherein said combined color image is a simulated reproduction of a process or three color original image.

27. A method of mapping a full color image to a highlight color image producible by a printer comprising the steps of:

defining a substantially planar triangular color space comprising a complete set of possible colors for a highlight color printer;

determining in said color space, the location of a fully saturated color for any given hue in the full color image;

mapping the color space to a triangle of printable colors for the given hue, said triangle being a subset of the color space and having its apex coinciding with the location of the fully saturated color of the given hue;

combining two complementary ink patterns, on an imaging surface thereby forming a representation of an elemental area of an original image; and repeating said step of combining complementary ink patterns for each elemental area of said original image.

28. A method of mapping a full color image to an arbitrary highlight color image producible by a printer comprising the steps of:

defining a substantially planar triangular color space comprising a complete set of possible colors for a highlight color printer;

defining, in said color space, a locus curve of fully saturated colors;

identifying the hue of the highlight color of the printer;

sliding the fully saturated colors around the locus curve until the hue at a rightmost point of the curve corresponds to the hue of the highlight color;

mapping the color space into a triangle of printable colors for a given hue, said triangle being a subset of the color space and having its apex coinciding with the location of a fully saturated color of the given hue;

forming a combination of two different complementary ink latent image pixel charge patterns, with voids, interposed on a single charge retentive imaging surface with one imaging means from electronically stored sets of said complementary ink image patterns, to form a combined tri-level image pattern on said charge retentive imaging surface;

respectively developing said combined tri-level image on said charge retentive imaging surface with two differently colored inks to form a combined color image; and transferring said combined color image to a copy substrate in a single pass.

29. The method of claim 28, wherein said combined color image is a simulated reproduction of a process or three color original image.

30. A method of mapping a full color image to an arbitrary highlight color image producible by a printer comprising the steps of;

defining a substantially planar triangular color space comprising a complete set of possible colors for a highlight color printer;

defining, in said color space, a locus curve of fully saturated colors;

identifying the hue of the highlight color of the printer;

sliding the fully saturated colors around the locus curve until the hue at a rightmost point of the curve corresponds to the hue of the highlight color;

mapping the color space into a triangle of printable colors for a given hue, said triangle being a subset of the color space and having its apex coinciding with the location of a fully saturated color of the given hue;

combining two complementary ink patterns, on an imaging surface thereby forming a representation of an elemental area of an original image; and repeating said step of combining complementary ink patterns for each elemental area of said original image.

31. A method of mapping a full color image to a highlight color image producible by a printer comprising the steps of:

expressing the highlight color in color coordinates of a color coordinate system;

expressing a sample color in the full color image in color coordinates of the color coordinate system;

using all of the color coordinates to map the full color image to a highlight color image such that the mapped highlight color image includes no more of the highlight color than is present in the sample color;

forming a combination of two different complementary ink latent image pixel charge patterns, with voids, interposed on a single charge retentive imaging surface with one imaging means from electronically stored sets of said complementary ink image patterns, to form a combined tri-level image pattern on said charge retentive imaging surface;

respectively developing said combined tri-level image on said charge retentive imaging surface with two differently colored inks to form a combined color image; and transferring said combined color image to a copy substrate in a single pass.

32. The method of claim 31, wherein said combined color image is a simulated reproduction of a process or three color original image.

33. A method of mapping a full color image to a highlight color image producible by a printer comprising the steps of:

expressing the highlight color in color coordinates of a color coordinate system;

expressing a sample color in the full color image in color coordinates of the color coordinate system;

using all of the color coordinates to map the full color image to a highlight color image such that the mapped highlight color image includes no more of the highlight color than is present in the sample color;

combining two complementary ink patterns, on an imaging surface thereby forming a representation of an elemental area of an original image; and repeating said step of combining complementary ink patterns for each elemental area of said original image.

* * * * *